(No Model.)

G. F. BUTTERFIELD.
SHOE SOLE AND HEEL VULCANIZING APPARATUS.

No. 596,476. Patented Jan. 4, 1898.

WITNESSES.
Matthew M. Blunt.
John M. Saxe.

INVENTOR.
George F. Butterfield
by R. H. Pierce
ATT'Y.

UNITED STATES PATENT OFFICE.

GEORGE F. BUTTERFIELD, OF STONEHAM, MASSACHUSETTS.

SHOE SOLE AND HEEL VULCANIZING APPARATUS.

SPECIFICATION forming part of Letters Patent No. 596,476, dated January 4, 1898.

Application filed October 19, 1896. Serial No. 609,308. (No model.)

*To all whom it may concern:*

Be it known that I, GEORGE F. BUTTERFIELD, of Stoneham, in the county of Middlesex and State of Massachusetts, have invented certain new and useful Improvements in Shoe Sole and Heel Vulcanizing Apparatus, of which the following, taken in connection with the accompanying drawings, is a specification.

My invention is an improvement in apparatus for uniting rubber soles to the bottoms of leather boots and shoes by those essentials of the vulcanizing art—heat and pressure.

The feature most characteristic of my apparatus is, first, a vulcanizing-mold comprising a steam or hot air chamber having inlet and outlet pipes and a flexible top or diaphragm, preferably with a sole-shaped recess or bed in or upon its upper surface to receive and give a yielding movement to the rubber sole and permit heat to be applied to the bottom only. In addition to this I provide a peculiar shell-like shoe-holder carried vertically on a shaft connected with pressure mechanism to raise and lower and to hold firmly in its lowered position with the shoe pressed powerfully down upon the rubber sole held up by the yielding diaphragm distended and fitted to the curved bottom of the shoe by the steam-pressure. The shoe-holder may be adjusted horizontally in all directions. The lasts are preferably hollow or formed with a continuous passage for cold water, through inlet and outlet pipes, to give speedy cooling after the rubber is vulcanized.

Figure 1:
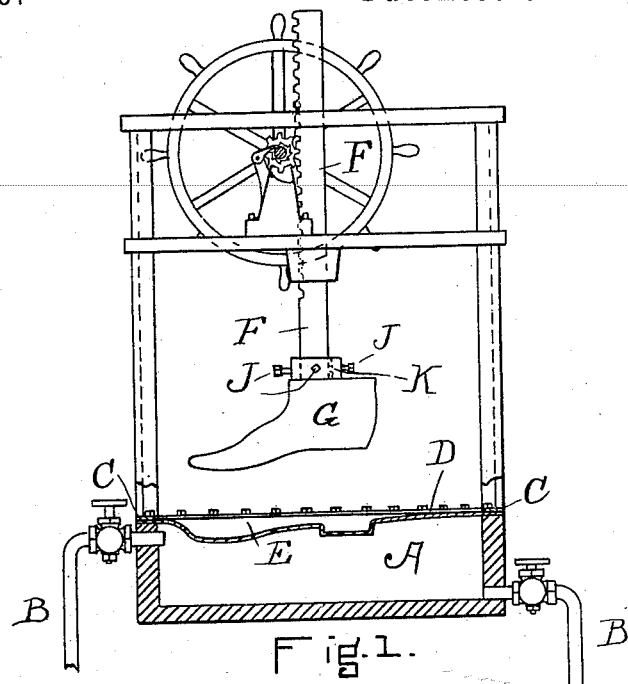
Figure 2:
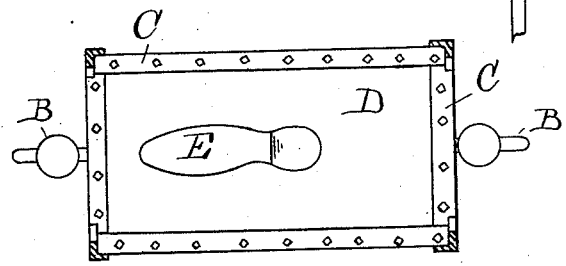
Figures 3, 4:
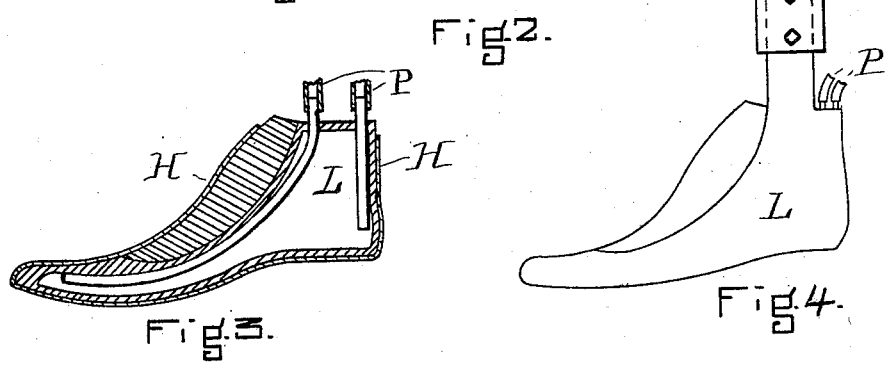

In the drawings, Figure 1 is a side view of my improved vulcanizing apparatus, partly in vertical section. Fig. 2 is a top plan of the vulcanizing-chamber, showing the flexible diaphragm with a mold or recess for the sole and heel. Fig. 3 is a sectional view through the shoe and its last, showing the water-passages. Fig. 4 is a side view of the last.

A is the steam-chamber provided with inlet and outlet pipes B to keep up the current at the required heat and pressure, so that the rubber of the sole may be properly cured and secured to the shoe-bottom.

D is a flexible diaphragm forming a yielding top to the chamber. The margin of the diaphragm is held steam-tight upon the edge walls of the chamber by clamping-strips C, screwed firmly thereto. The diaphragm is formed, preferably, of alternate layers of rubber and canvas, so as to have the required strength and the desired flexibility.

E represents a sole-shaped mold or recess formed in or upon the diaphragm or in a yielding plate attached centrally thereto. Said mold or recess is adapted to receive the rubber sole which is to be affixed to the shoe-bottom, and it will be of such form and with or without a heel-cavity, as circumstances require. The mold or recess may be omitted where soles without heels are to be applied, since the steam-pressure causes the diaphragm and the sole thereon to conform to the curvatures of the shoe-bottom.

F is a plunger or vertically-movable shaft having proper bearings and provided with suitable mechanism to move it up and down above the center of the mold and to hold it firmly when adjusted. Instead of the rack and gear shown a screw-shaft and hand-wheel or a cam-lever may be employed.

G is a shoe-holder attached to the foot of the shaft F and adapted to receive from beneath and into its concavity the shoe H, mounted upon the hollow last L. The shoe is suitably held within said holder. The holder and shoe may be adjusted laterally with relation to the shaft by means of adjusting-screws J, passing through an enlarged collar K on the holder and bearing at the tip against the shaft. The foot of the plunger F may have a socket to receive an extension of the last L, so as to give the direct downward pressure.

The steam-pressure beneath the yielding diaphragm tends to press upwardly the mold E and rubber sole therein, while the plunger and connected mechanism force the shoe downwardly upon such sole. The result is the most intimate contact of every part of their surfaces under conditions of heat and pressure most favorable to their permanent union.

For speedy cooling of the shoe-sole when vulcanized, as well as to avoid overheating the upper-leather during the process, I make the last L hollow and pass a current of cold water through it by means of the hose-pipes P.

I claim as my invention—

1. In a shoe sole and heel vulcanizing apparatus, a steam-chamber provided with a flexible top which top is adapted to receive and hold the rubber sole in combination with suitable means for pressing a shoe thereon, substantially as set forth.

2. In a shoe sole and heel vulcanizing apparatus, a steam-chamber having a flexible top with a sole or heel shaped mold or bed therein, in combination with a last, a vertically-movable shaft or bar to engage the last to press the shoe against the sole held in said mold, and with means for applying and maintaining such pressure, substantially as set forth.

3. In a shoe sole and heel vulcanizing apparatus, a steam-chamber having a flexible top with a sole-shaped mold therein, in combination with a vertically-movable shaft and pressure mechanism therefor and with shoe-holding devices carried on said shaft, substantially as set forth.

4. In a shoe sole and heel vulcanizing apparatus, a steam-chamber having in its top section a sole-shaped mold or recess, a vertically-movable shaft above such recess and mechanism for raising and lowering such shaft and for maintaining pressure thereon, in combination with a hollow metallic last connected to the foot of said shaft and with water inlet and outlet passages for admitting cold water to traverse the last, substantially as set forth.

In testimony whereof I have signed my name to this specification, in the presence of two subscribing witnesses, on this 16th day of October, A. D. 1896.

GEORGE F. BUTTERFIELD.

Witnesses:
  A. H. SPENCER,
  N. K. BAKER.